June 13, 1933.  G. F. ANDERSEN  1,913,470
DEHYDRATING PROCESS AND APPARATUS
Filed Feb. 25, 1929
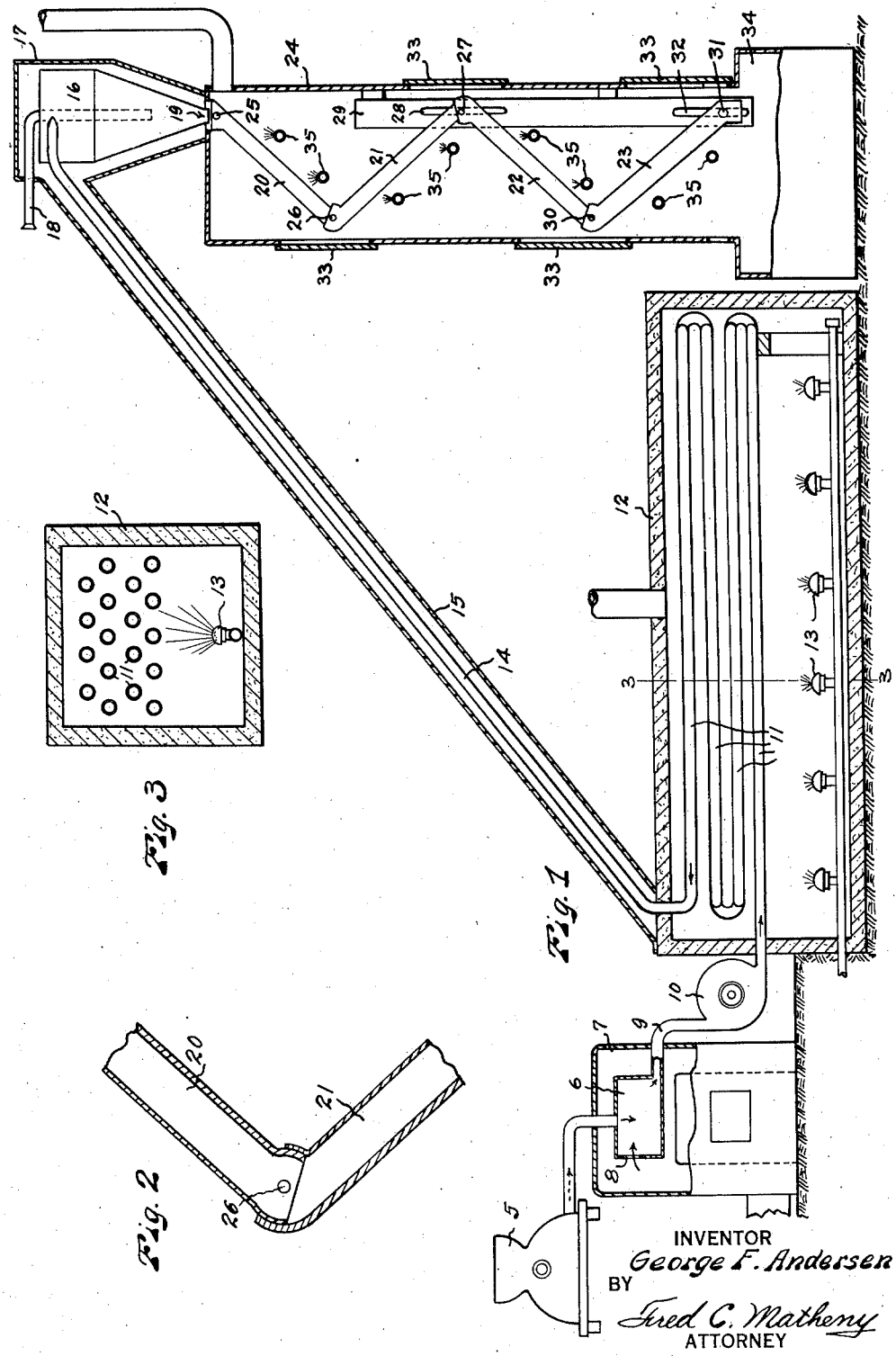
INVENTOR
George F. Andersen
BY
Fred C. Matheny
ATTORNEY Patented June 13, 1933

1,913,470

UNITED STATES PATENT OFFICE

GEORGE F. ANDERSEN, OF SEATTLE, WASHINGTON, ASSIGNOR, BY DIRECT AND MESNE ASSIGNMENTS, TO WELTHA PROCESS CORPORATION, OF SEATTLE, WASHINGTON, A CORPORATION OF WASHINGTON

DEHYDRATING PROCESS AND APPARATUS

Application filed February 25, 1929. Serial No. 342,622.

My invention relates to improvements in a process and apparatus for dehydrating finely divided or pulverized material and the object of my invention is to provide a process and apparatus by which finely divided mineral matter which carries a substantial percentage of water of crystallization may be quickly and easily and efficiently dehydrated and reduced to a thoroughly dry powdered state and by which said dehydrated material may further be rendered relatively non-absorbent as respects the moisture in the atmosphere.

Another object is to provide a dehydration and apparatus in which the process of dehydration is carried out, for the most part, in closed pipes and conduits, whereby the danger of the material picking up or absorbing undesirable outside gases during the process is reduced to a minimum and the quality and uniformity of the resulting product is increased.

A further object is to provide a process and apparatus which are especially adapted to the dehydration of finely divided sodium sulphate but which may also be employed in connection with other substances.

Other and more specific objects will be apparent from the following description taken in connection with the accompanying drawing.

In the drawing Figure 1 is a somewhat diagrammatic view partly in elevation and partly in section of dehydration apparatus constructed in accordance with my invention.

Fig. 2 is an enlarged fragmentary sectional view of a detail of chute or conveyor embodied in the invention.

Fig. 3 is a cross section on broken line 3—3 of Fig. 1, showing the arrangement of pipes in the retort.

In a general way, my process consists in pulverizing material which contains moisture, as water of crystallization, then blowing this pulverized material through pipes or conduits which are heated by external means, to a temperature not to exceed ninety degrees Fahrenheit, then delivering this material into a centrifugal dust collector which retains the material and allows the air and vapor to escape into the atmosphere, then, allowing said material to slide down in a thin film over the bottom plates of a chute which are subjected to a gradually increasing temperature ranging from two hundred and fifty degrees at the top to three hundred and fifty degrees at the bottom to drive off any remaining moisture and to render the resultant dehydrated product substantially incapable of re-absorbing moisture from the atmosphere.

The apparatus for carrying out my process may embody a grinder 5 arranged to deliver pulverized material into a receptacle 6 disposed within a preheating furnace 7. The receptacle 6 has an opening 8 on one side for the admission of heated air from the furnace and is connected at another point with a conduit 9 which extends to a fan or blower 10. The discharge from the blower 10 is connected with a relatively long run of pipe 11 within a low heat furnace 12. Suitable heating means, as gas jets 13 are provided within the furnace 12 for heating the space within said furnace through which the pipe 11 passes. The end of the pipe 11 farthest from the blower 10, is connected with a pipe 14 which extends out of the furnace 12 and upwardly at an incline through a heat insulating conduit 15 and delivers into a cylindrical receptacle 16 of the form commonly known as a centrifugal or cyclone dust collector. To prevent the escape of heat, the collector 16 is enclosed within a jacket 17 of non-heat conducting material. This collector 16 permits the air and vapor to escape through a pipe 18 but retains the pulverized material, which is caused to descend through the funnel shaped bottom end 19 of the receptacle 16 and is discharged into a flat rectangularly shaped chute composed of a plurality, four more or less, pivotally connected sections 20, 21, 22 and 23 arranged in zig-zag relation and all inclined downwardly so that the material will run by gravity therein. The receptacle 16 rests upon the top of the housing of a high heat furnace 24 and the chutes 20, 21, 22, and 23 are disposed within said furnace 24. The upper end of the uppermost chute 20 is supported on pivot means 25 which is fixed relative to the furnace 24. The lower end of the upper chute 20 is connected by pivot means 25 with the upper end of the second chute 21. The lower end of the chute section 21 is connected by pivot means 27 with the upper end of the chute section 22 and the pivot means 27 is guided for vertical movement relative to the housing 24 as by slot means 28 in a guide member 29, the pivot 27 being arranged to be clamped in any adjusted position on the guide member 29. The lower end of the chute section 22 and the upper end of the chute section 23 are connected with each other by pivot means 30 while the lower end of the chute section 23 is connected by pivot means 31 with the guide member 29 and is vertically adjustable in a slot 32 in said guide member.

By raising the pivots 27 and 31 the inclination or angle of all of the chutes 20, 21, 22 and 23 relative to the vertical may be increased and the material caused to slide more slowly down said chutes and by lowering said pivots 27 and 31 the angle of the chutes relative to the vertical may be decreased and the velocity of the material within said chutes increased. By adjusting the pivots 27 and 31 it is possible to vary the inclination of the two upper chute sections 20 and 21 relative to the two lower sections 22 and 23 or vice versa. Obviously a greater or less number of the zig-zag chute sections may be used if desired. Doors 33 may be provided at intervals in the housing 24 to afford access to the several chutes and said chutes may discharge into a receptacle 34 at the bottom of the housing 24. Burners 35 within the furnace housing 24 provide means for heating the interior of said furnace housing. These burners 34 are preferably located beneath the bottom of each chute section so that the bottom plate of each chute section will be heated by the burners and the material will receive the full benefit of this heat as it travels downwardly in a thin film over the bottom plate of each chute section. The temperature within the furnace housing 24 is considerably higher than the temperature in the pipes and may range from two hundred fifty degrees Farenheit at the top to three hundred fifty degrees Farenheit at the bottom.

The several chute sections are completely enclosed and have tight walls and said chute sections are so shaped as to maintain tight contact at the location of their pivotal connections as shown in Fig. 2. This prevents the gases within the furnace 24 from coming into contact with the material which is being treated, thus safeguarding the material against the possible absorption of undesirable gases.

In carrying out my process I take a mineral matter which contains a large percentage of water of crystallization, as sodium sulphate or aluminum sulphate. This material is pulverized in the grinder 5, thence passes into the receptacle 6. From the receptacle 6 the material, along with warm air from the furnace 7, is drawn by suction to the fan 10 and is then blown through the pipes 11 and delivered by the pipe 14 into centrifugal separator 16 where the material is retained and the air and vapor discharge through the pipe 18. During its passage through the pipe 11 the temperature of the material is gradually raised and the material is subjected to a gentle dehydration process, the water of crystallization disappearing under the action of the gentle heat. The temperature in the pipes 11 preferably does not exceed ninety degrees Farenheit. By the time the material reaches the separator 16 the dehydration process will be substantially complete and the air and vapor will be permitted to escape to the atmosphere through the pipe 18. The product will then pass down in a thin film over the bottom plates of the several chute sections where it will be subjected to higher heat which will drive off any remaining moisture and which, I find, will render the product resistant to the absorption of moisture from the atmosphere.

Throughout its entire course of treatment the material is protected from direct contact with heated gases in the furnaces thus precluding the possibility of the product absorbing undesirable gases. By employing my process and apparatus I am able to take sodium sulphate containing 56.1% water of crystallization and obtain an amount of the dehydrated product equal to 85% of the original weight of the raw product taken.

I have shown three separate furnaces 7, 12 and 24 but it will be understood that these three may all be combined in one furnace with means for regulating the different heat required at different stages.

Obviously changes in my process and the apparatus for carrying out the process may be made within the scope and spirit of the following claim.

I claim:

The process of dehydrating mineral salts containing a high percentage of water of crystallization which consists of pulverizing the salts, subjecting the same to a preheating in the presence of air, then further heating the material while being passed through externally heated conductors, and gradually increasing the heat without admission of air, then separating the air and vapor from the material, then subjecting the material to a higher heat and thereby driving off all remaining moisture, the material throughout its course being protected from the absorption of undesirable gases.

The foregoing specification signed at Seattle, Wash., this 11th day of Feb., 1929.

GEORGE F. ANDERSEN.